United States Patent

Toussaint

[15] 3,652,859

[45] Mar. 28, 1972

[54] AMPLIFIER DEVICE USING EMISSION AND PHOTO DIODES

[72] Inventor: Hans-Norbert Toussaint, Munich, Germany

[73] Assignee: Siemens & Halske Aktiengesellschaft, Berlin and Munich, Germany

[22] Filed: Aug. 26, 1968

[21] Appl. No.: 778,355

Related U.S. Application Data

[63] Continuation of Ser. No. 355,121, Mar. 26, 1964, abandoned.

[30] Foreign Application Priority Data

| | | |
|---|---|---|
| Apr. 1, 1963 | Germany | S 84504 |
| Dec. 20, 1963 | Germany | S 88823 |
| Dec. 20, 1963 | Germany | S 88824 |

[52] U.S. Cl. ....................250/211 J, 250/217 SS, 333/97

[51] Int. Cl. ....................H01j 15/00

[58] Field of Search ....................250/211 J, 217 SS, 209; 333/97

[56] References Cited

UNITED STATES PATENTS

| | | | |
|---|---|---|---|
| 2,776,367 | 1/1957 | Lehover | 250/211 J |
| 3,043,958 | 7/1962 | Diemer | 250/211 J |
| 3,072,012 | 1/1963 | Pandell et al. | 250/237 |
| 3,100,282 | 8/1963 | Fletcher | 330/68 |
| 3,229,104 | 1/1966 | Rutz | 250/211 J |
| 3,304,430 | 2/1967 | Biard et al. | 250/211 J |
| 3,321,631 | 5/1967 | Biard et al. | 250/213 A |
| 3,278,814 | 10/1966 | Rutz | 250/211 |
| 3,138,768 | 6/1964 | Evans | 333/97 |
| 3,143,655 | 8/1964 | Strandberg | 250/239 |

*Primary Examiner*—Walter Stolwein
*Attorney*—Hill, Sherman, Meroni, Gross & Simpson

[57] ABSTRACT

An electro-optical amplifier for oscillations, particularly in the range of very short electromagnetic waves comprising an amplifier input circuit including at least one emission diode, a direct current source connected to the emission diode for biasing the emission diode in a flow direction, the emission diode being operative to transform the electrical signal oscillation into an optical signal, at least one photodiode optically connected with the emission diode, an output amplifier circuit operatively connected with the photo diode, the photodiode being operative to transform the received optical signal into electrical oscillation signals, and the amplified signals appearing at the output of the amplifier output circuit. The emission diode of the photodiode is arranged in sections of coaxial conductors which are closed at the end and which have windows disposed adjacent to the diodes to allow light to be transmitted between the two diodes.

1 Claims, 7 Drawing Figures

AMPLIFIER DEVICE USING EMISSION AND PHOTO DIODES

This is a continuation of Ser. No. 355,121 filed Mar. 26, 1964, now abandoned.

The invention relates to an amplifier device for frequencies situated especially in the range of very short electromagnetic waves.

As amplifier devices for the range of low frequencies there are known particularly the transistor and the electron tube. The amplification principles of these can be used for highest frequencies, requiring, however, specially designed devices therefore. The disk triode and the high-frequency transistors in coaxial arrangements are examples thereof. In these constructional elements it is, however, disadvantageous that the input circuit is not uncoupled from the output circuit. This retroaction makes itself noticeable in an especially troublesome way if the amplifier, as generally the case in highest frequency technology, is selective. In the already mentioned known elements such as the disk triode and the high-frequency transistor the retroaction comes about through a capacitive coupling between input and output of the amplifier element. The retroaction of such elements also causes trouble in some switching uses in the range of lower frequencies.

The invention has at its problem the creation of an amplifier device that is free of retroaction up to the highest frequencies.

In an amplifier device for frequencies, particularly those in the range of the very short electromagnetic waves, this problem is solved, according to the invention, by a method such that as an input there is provided at least one emission diode, and as output at least one photodiode is provided, such diodes forming spatially separated elements which are optically coupled with each other.

An advantageous form of execution is one in which, as an input of the amplifier device, several emission diodes having separate connections are provided. Another advantageous form is one in which photodiodes, having several separate connections, are provided. It is also conceivable to couple several emission diodes and several photodiodes simultaneously by radiation. These forms of execution of the object of the invention make it possible to reconstruct known tube systems employing triodes, for example, a triode with two or three control grids and an anode in common for all the grids or, a triode in which one or more control grids act on separate anodes. These systems can be used, accordingly for the additive composition of signals or for the separate transmission of an amplified signal from several connections. What is dominant, however, is that the amplifier device according to the invention, in contrast to usual triodes and transistors, is practically free of retroaction.

It is advantageous, furthermore, if means are provided for optical beam conduction, to effect a concentration or focusing of the radiation of the individual emission diode to at least one of the photodiodes.

For the technological execution of the device of the invention it is advantageous if the emission diodes and the photodiodes are arranged in a casing that at least partially provides an optically masking. The casing may advantageously be so constructed that it is also electrically shielding. In this connection there is conceived the provision of an electrical screening between the emission diodes and/or the photodiodes, leaving free only an optical coupling path between the emission diodes and the photodiodes.

An increase of the attainable amplification values can in many cases by additionally achieved by cooling the individual diodes, for example, to the temperature of liquid nitrogen.

In the drawing, wherein like reference characters indicate like or corresponding parts:

Figure 1:
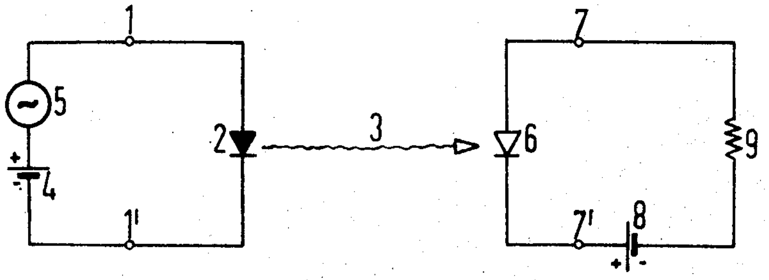
FIG. 1 is a schematic figure of an amplifier embodying the invention.

FIG. 1 illustrates schematically an example of an amplifier system constructed according to the invention. The input terminals 1/1′ of the amplifier device are formed by the terminals of a so-called emission diode 2. This diode has the property of emitting very nearly monochromatic electromagnetic radiation 3 if it is poled in direction of flow, with radiation intensity being proportional to the current flowing through the diode. If the current flowing through the emission diode in pass direction is modulated, the intensity of the emitted electromagnetic radiation is modulated to a corresponding degree. In the emission diodes obtainable at the present time, an effective modulation is already possible at frequencies in the gigacycle range. The direct biasing voltage source 4 substantially establishes the working point of the emission diode. The source 4 is connected in series with an alternating voltage source 5, which delivers the signal to be amplified, the voltage of the source 5 thus being superimposed on the voltage of the battery 4. As already explained above, by the application of voltage of the source 5 on the diode 2, a corresponding intensity modulation of the emitted radiation is effected. The electromagnetic radiation 3, after passage through a suitable medium, is absorbed in the photodiode 6, wherein, through absorption of a light quantum a corresponding number of electric charge carriers is formed. These charge carriers appear in the output circuit of the amplifier system (output terminals 7/7′, battery 8, load resistance 9) as a corresponding current. The battery 8 is poled in such a way that through it the photodiode 6 is biased in blocking direction. If the so-called quantum efficiency of the emission diode 2 is designated as νE and the quantum efficiency of the photodiode νp, there holds for the current amplification of the system (that is, for the relation of output short circuit current $I_2$ to input current $I_1$) the following:

$$I_2/I_2 = \nu E \cdot \nu P \cdot$$

For example, at $\nu E = \nu P = 70$ percent there results $$\frac{I_2}{I_1} \approx 0.5$$

From the fact that the current amplification is smaller than 1, it is not permissible to infer a powder amplification smaller than 1. If with $R_2$ there is designated the differential resistance of the emission diode 2, with $R_9$ the value of the load resistance 9, the amplification Γ is given by $$= \frac{I_2^2 \cdot R_9}{I_1^2 \cdot R_2} = (\eta E \cdot \eta P)^2 \cdot \frac{R_9}{R_2}$$

The differential resistance of the emission diode amounts, for example, in currents on the order of magnitude of 10 ma. to about 1Ω. In contrast to this, the dynamic resistance of the photodiode is on the order of magnitude of 100 kΩ. With these great resistance values, load resistance 9 with considerably higher resistance values than that of the input may be employed, without sacrifice of current amplification. While the value of load resistance 9, in the microwave range, in view of the capacity of the photodiode, will generally be selected on the order of magnitude of ten to few hundred ohms, even these resistance values will enable a power amplification. It is important, however, that the capacitance of the photodiode does not cause any retroaction of the output circuit on the input circuit. As a photodiode, poled in blocking direction, cannot emit any radiation, a retroaction cannot occur.

The ohmic working resistance located in the output circuit of the amplifier system of FIG. 1 causes a direct-current voltage drop which is proportional to the value of this resistance and to the mean exposure of the photodiode. Especially in a use of the amplifier system with high frequencies, a direct voltage drop is undesirable, since the blocking layer capacity of the photodiode changes therewith, which can lead to a wrong selection of the load on the output side. The direct voltage drop at the load resistance can be avoided if this is inductively coupled into the output circuit. Instead of the ohmic resistance it is possible too, to use reasonance circuits and networks with reactances, which may consist of concentrated or distributed elements.

For the amplifier system according to the invention it is important that the emission diode and the photodiode be arranged spatially independent of each other. The spatial arrangement is expediently selected in such a way that no electrical coupling exists between the two elements. Independently of the existing electrical uncoupling, the necessary optical coupling can be accomplished by means in themselves known, as for example, lenses, mirrors and/or optical wave conductors, or by optical alignment.

Suitable materials for the emission diodes preferably are gallium-arsenide crystals or mixed crystals of gallium-arsenide phosphide. The semiconductor material for the photodiode expediently is so selected that the photodiode has a great sensitivity in the frequency range of the circuit containing the emission diode. Silicon photodiodes are especially suitable for use with the arsenide phosphide.

Emission diodes may be classified in two types, which differ particularly in regard to the geometry of the semiconductor crystal. The one type emits sharply concentrated coherent radiation; the other emits less sharply concentrated and incoherent radiation. Fundamentally both types of emission diodes are suitable, but because of the higher quantum efficiency of the firs mentioned type, it is to be preferred.

Figure 2:
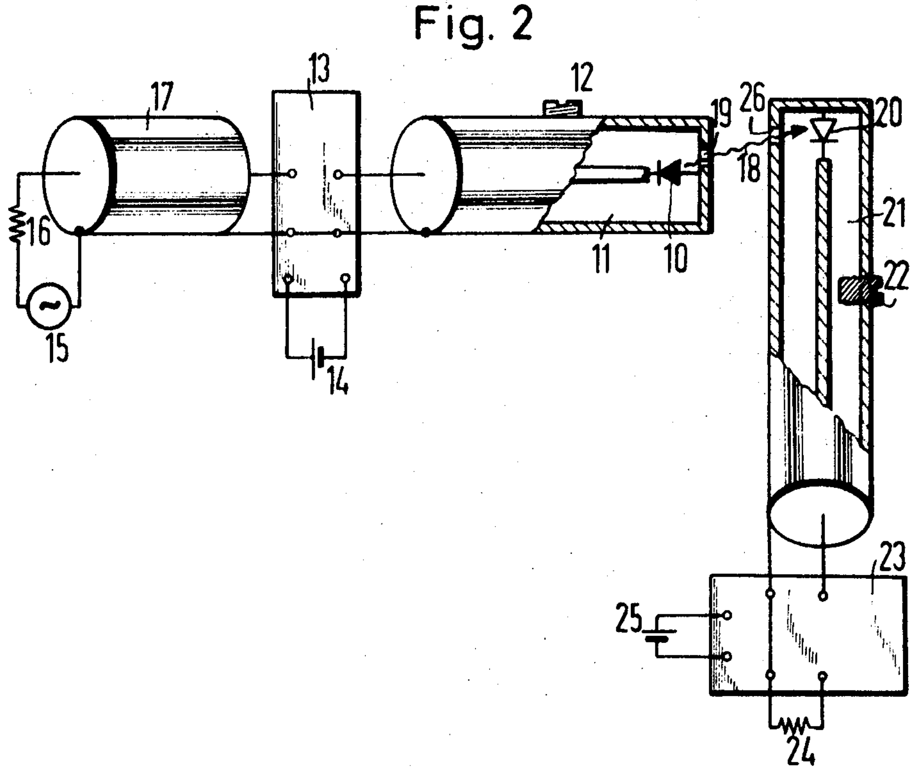
FIG. 2 illustrates an embodiment of the invention utilizing a coaxial type of construction.

FIG. 2 illustrates schematically an example of an expedient spatial arrangement of the emission diode and of the photodiode in an amplifier of coaxial type construction in which the emission diode 10 is inserted in a coaxial conductor 11. The imaginary part of the impedance of the emission diode is balanced out by a suitable tuning element, for example a capactively acting screw 12 at $\lambda/4$ distance ($\lambda+$ wave length in the conductor). A battery 14, connected by a transformation member 13, simultaneously serves for the biasing of the diode in flow direction, and for transforming the remaining real part to a resistance value for which the generator 15 (with internal resistance 16) over line 17 to the transformation member 13 is matched. The transformation member is constructed preferably of reactances, for the avoidance of losses, concentrated or distributed reactances being employed dependent upon the frequency range being employed. The emitted radiation 18 passes through a small hole 19 in the wall of the coaxial conductor 11 into the open and is directed over optical devices, not represented in detail, to the photo sensitive layer of the photodiode 20, which is arranged in another coaxial conductor 21. By means of suitable turning elements 22 the capacity of the photodiode is balanced. A suitably dimensioned transformation member transforms the real part of the impedance of the photodiode into a suitable value, which with a given resistance of the load 24 supplies maximal power thereto. The transformation member 23 is constructed for the avoidance of losses, preferably of reactances, concentrated or distributed reactances, depending on the frequency range being employed. The battery 25 biasing the photodiode in blocking direction is connected over the transformation member 23.

The opening 19 in the coaxial conductor 11 and the opening in the coaxial conductor 21 are designed in such a way and so arranged in the coaxial conductors that through the respective outlet and entry openings, for the optical radiation, the currents flowing over the wall are impeded as little as possible. Especially suited for this is a slit running in the direction of the wall currents, the form of which slit is to be adapted to the cross section of the optical beam path. Corresponding considerations apply in the case of emission diodes and photodiodes arranged in hollow conductors. If the openings are arranged in accordance with the above explanations, practically no field lines will emerge from the wave conductors through the openings and no retroaction will occur. Under some circumstances it may be expedient to cover the light emergence and/or the light entry openings with an optically permeable material of high dielectric constant or high permeability. Whether a material with high dielectric constant or of high permeability is to be preferred depends on the location of the opening in the wall of the conductor. It may also be expedient to cover both openings with a common material which is optically permeable. The form and dimensions of the material may expediently be chosen in such a way that the emitted light is directed in concentrated or focused form at the photosensitive point of the photodiode.

It is well known that an emission diode poled in flow direction emits radiation while, if it is operated in blocking direction, acts as a photodiode. According to a further development of the invention this is utilized for the realization of an amplifying system free of retroaction, with reversible transmission direction in such a manner that input and output circuit of the amplifier system each have an emission diode. In each case the diode operative as an input is biased in flow direction, and the other in blocking direction. By simple polarity reversal of the operating potentials, the transmission direction can be reversed. With use of like diodes a radiation emitters and radiation receivers, in the usual case, the wave length of the radiated energy will not lie in the range of maximum sensitivity, but here, as a rule, there still remains a power amplification. It is possible to alleviate this difficulty, for example, by providing in the input and in the output of the amplifier system in each case a series connected gallium-arsenide diode and a silicon photodiode, the diodes as viewed in the individual series circuit being poled in the same sense. If the output side series circuit is biased so high in blocking direction that the gallium-arsenide diode operates in the breakthrough range, and therefore has a very small differential resistance, on the output side there functions for the current control only the silicon photodiode, which is of high resistance in comparison to the gallium-arsenide diode of the series circuit, and will change its resistance value in dependence on the radiation striking it. The gallium-arsenide diode of the one series circuit is radiationally coupled with the silicon photodiode of the other series circuit.

As a result of the electrical separation of the input and output circuits (FIG. 1), the device of this invention may be used in several ways including applications which require the use of low frequencies or direct current. For example, it is possible to measure without danger the direct current flowing in a line (with high voltage against ground). The emission diode is inserted into the line and the photodiode, located at a safe distance, delivers a current which is proportional to the number of photons emitted from the emission diode per unit of time. The photon stream, however, is, on the other hand, proportional to the current to be measured.

Also for the amplification of electrical oscillations in the range of the low frequencies the concept of the invention can be applied to advantage, because no retroaction occurs.

In further development of the invention the efficiency can be additionally increased over the value ordinarily obtainable.

This is achievable by a method such that in an amplifier system according to the invention the idling current flowing through the emission diode is chosen so high that the working point thereby established lies below the maximally possible absolute quantum efficiency in the range of maximum differential quantum efficiency.

In this context, the following considerations may be taken as a starting point.

Figure 3:
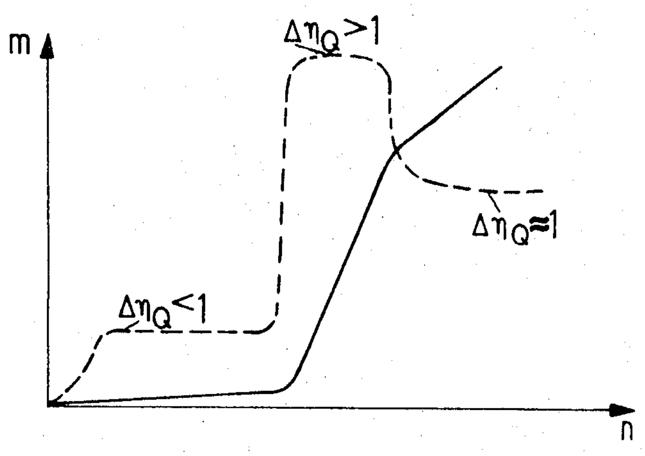
FIG. 3 is a diagram illustrating the quantum efficiency of an emission diode.

In FIG. 3 the course of the quantum efficiency is shown of an emission diode, in the form of a diagram. On the abscissa of the diagram there is plotted the number n of the electrical charge carriers fed to the emission diode per time unit. On the ordinate there is shown in each case for the same time unit the number *m* of the photons given off by the emission diode. The course of quantum efficiency $\nu_Q$ is such that the absolute value 1 as maximum value is reached only at a very high number *n* of electrical charge carriers per unit of time. Accordingly, as a rule the biasing of the emission diode will be such as to obtain an idling flow, in the flow direction as high as possible, in order to approximate the quantum efficiency $\nu_Q$, defined as the number of photons given off per unit of time to the number of charge carriers traversing the emission diode per unit of time, insofar as possible of the value 1. As the investigations basic to the invention have shown, however, it is considerably more advantageous, especially with use of such amplifier systems for the amplification of weak signals, to choose the idling current only so high that the emission diode lies in the range of maximum differential quantum efficiency. The curve of the differential quantum efficiency $\nu_Q$ is indicated in broken lines in FIG. 3 and is derivable by differentiation from the other curve. It is necessary, then, as viewed from the total electrical efficiency, to use a relatively high current in the flow direction as idling current and there are obtained for this idling current relatively few photons. It is achieved, however, that with even only a slight change of the charge carriers flowing through the emission diode per unit of time, a relatively very great change results, and thereby of the modulation amplitude of the photon current, which is fed to the photodiode.

Figure 4:
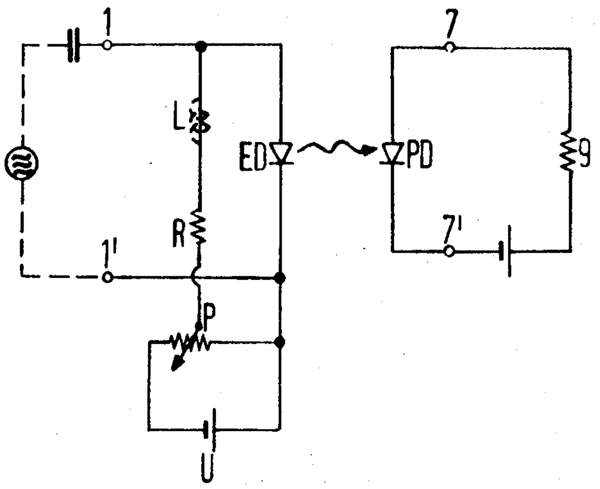
FIG. 4 illustrates a circuit embodying the invention.

A circuit for effecting adjustment of this working point is shown in broken lines in FIG. 4. The emission diode is not fed directly from a battery U, but from a voltage divider P, with the aid of which the idling current flowing through the diode can be adjusted over another series resistance R to the desired amount. The connection of an inductance L, indicated in broken lines, is recommended in the case of small values of the series resistance R, and has the function of preventing an appreciable proportion of the modulation alternating current that is fed over the terminals 1,1′ from flowing over the feed current circuit and must, for this purpose have an impedance value so high at the modulation frequencies that the feed current supply presents a high resistance to the modulation current circuit.

The other embodiment of the circuit arrangement is similar to that previously described, the electromagnetic radiation of the emission diode ED being absorbed in the photodiode PD. In the photodiode PD, by absorption of light photons a corresponding number of electric charge carriers is formed. These charge carriers appear in the output circuit of the amplifier system (output terminals 7,7′, battery 8, load resistance 9) in a corresponding current. The battery 8 is so poled that the photodiode 6 is thereby biased in blocking direction. The biasing of the diode can, analogous to the emission diode feed, likewise take place over a potentiometer, and it is recommended here that the feed current circuit be uncoupled with respect to the modulation current circuit. Otherwise, in regard to other design factors of the amplifier, reference may be made to the discussion with respect to FIGS. 1 and 2.

An additional increase in efficiency may be obtained in a further development of the invention by an arrangement such that several emission diodes for the signal current are connected in series an coupled optically with at least one photodiode.

It is advantageous in this case if several photodiodes for the signal currents are connected in parallel and, preferably, a respective emission diode is coupled optically with each of the photodiodes.

This further development according to the invention permits, besides the essential increasing of the total quantum efficiency, the additional possibility of using the amplifier device as a wide band direct current amplifier in cascade circuit, by electrical coupling of one photodiode output with the emission diode input of the following stage.

In this further development according to the invention the insight is taken as a foundation, that in the electrical series connection of several emission diodes the movement of a certain number of charge carriers in one conduction section has, as a consequence, a corresponding charge carrier movement in each of the emission diodes. Thus, in each of the emission diodes, by the corresponding simultaneous charge carrier movement, there is released or given off a proportion of photon corresponding to the quantum efficiency of this emission diode. Even if the quantum efficiency in the individual emission diode lies considerably below 10 percent, it is possible by a corresponding number of emission diodes engaged in series, to achieve a photon number which lies correspondingly higher, dependent on the number of diodes utilized. It is then possible to arrive at a quantum efficiency greater than 100 percent or greater than 1.

The photons given off from the individual emission diodes can now be fed to a common photodiode. It is then only necessary to align the individual emission diodes correspondingly on the common photodiode. In a further development of the invention there may be provided several photodiodes in an electrically parallel circuit for the signal current, in which case, for example, to each emission diode a photodiode can be allocated. It is also possible, however, to provide fewer or more photodiodes. It is then only necessary to subdivide the photon current of the emission diodes correspondingly over the individual parallelly connected photodiodes for the signal current. Several photodiodes for one emission diode are recommended particularly when the emission diode gives off its photon radiation not concentrated in a narrow spatial sector, but distributed over a relatively large range. It is then possible to appreciable reduce the loss in photons which otherwise would not reach the photodiodes.

Figure 5:
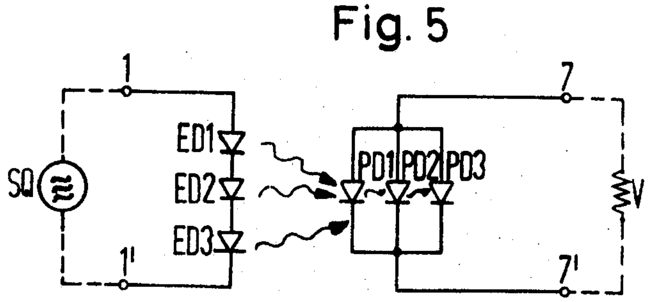
FIG. 5 illustrates a circuit employing several emission diodes and several photodiodes.

An example of a circuit with several photodiodes and several emission diodes is illustrated in FIG. 5, in which the signal source is designated SQ and the load is designated V (only outlined). Further, in FIG. 5 there is also omitted the operating supply voltages and operating currents, for the purpose of clarity. The emission diodes are designated ED and the photodiodes are designated PD. In each case the diodes having the same number index are optically coupled with each other, preferably by concentrating elements, such as lenses, fiber optics or mirrors, to effectively prevent any photon loss. The emission diodes are biased by a common voltage source in blocking direction in the indicated manner. Preferably, the emission diodes, insofar as possible, should be closely matched in their characteristics, so that in operation of the amplifier devices, at least the individual emission does have very nearly the same operating conditions, especially that of coherent radiation.

It is further recommended that the idling current flowing through the emission diodes be selected so high that the working point thereby established always lies below the maximally possible absolute quantum efficiency in the region of maximal differential quantum efficiency. The course of the quantum efficiency of an emission diode as shown in FIG. 3 may be initially considered. On the abscissa of the diagram there are plotted the number of electrical charge carriers fed to the emission diode per unit of time. On the ordinate are given for the same time unit the number of photons given off by the emission diode. The course of the quantum efficiency is such that the absolute value 1 as maximum value is reached only at very high numbers of electrical charge carriers per unit of time. As a rule an effort is made to connect the emission diode in flow direction with an idling current as high as possible, in order to approximate the quantum efficiency as close as possible to the value 1. As the investigations basic to the invention have shown, however, especially in the use of such amplifier devices for the amplification of weak signals it is considerably more advantageous to choose the idling current only so high that the emission diode lies in the range of maximum differential quantum efficiency. The curve of the differential quantum is indicated in FIG. 3 in broken lines and is derivable by differentiation from the other curve. While it is necessary, as viewed in total electrical efficiency, to extend a relatively large amount of current in flow direction as idling current and relatively few photons are obtained for this stead current, with even only a slight change of the charge carriers traversing the emission diode per unit of time, a relatively great change of the quantum efficiency is achieved, and thereby of the modulation amplitude of the photon current which is fed to the photodiode.

Figure 6:
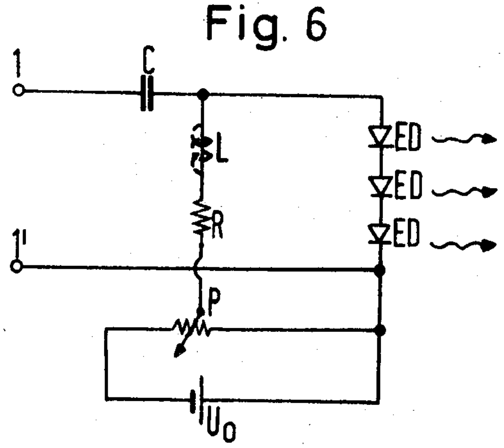
FIG. 6 illustrates an adjustable circuit employing several emission diodes.

A switching arrangement for the adjustment of this working point is shown in FIG. 6. The circuit part containing the photodiode is omitted in the drawing, because of the similarity to the circuit according to FIG. 5 and for the purpose of clarity. Also the photodiodes may advantageously receive their operating voltages and currents in the same manner shown for the emission diodes. The emission diodes are not fed directly from a battery, but from a voltage divider by means of which the steady idling current traversing the diodes can, if need be, be adjusted as desired over another series-resistance R. An inductance is recommended at a low resistance value of the series-resistance R, as it prevents an appreciable proportion of the modulation signal which is supplied over the input terminals 1,1′ from flowing over the feed current and it must, for this purpose, have such a high impedance value at the modulation frequencies that the feed current circuit presents a high resistance to the modulation signals. The capacitance eliminates a possible direct current component in the modulation signal.

Figure 7:
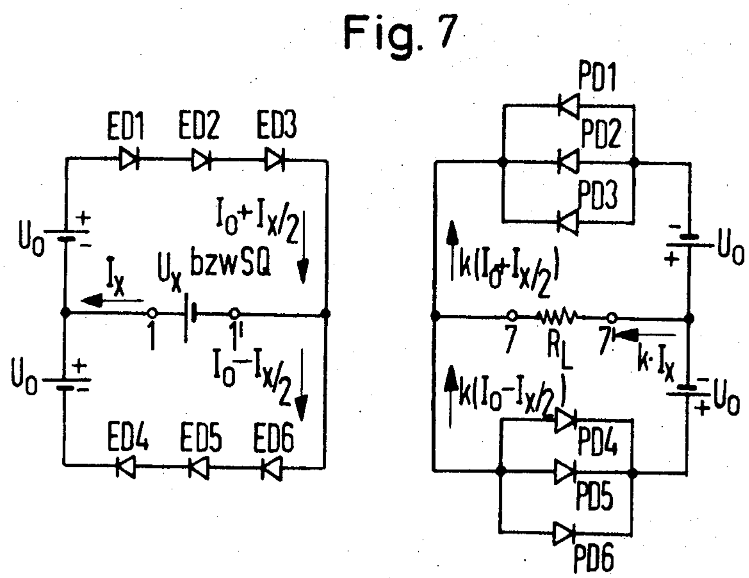
FIG. 7 illustrates a further modified circuit employing a plurality of emission diodes and photodiodes.

If such a direct current component is also to be supplied to the emission diodes ED, as is necessary, for example, in the case of a direct current amplifier, then there is recommended the use of bridge or push-pull circuits for the amplifier. An advantageous circuit arrangement of this kind according to the invention is illustrated, as an example, in FIG. 7, wherein $U_x$ designates the signal voltage, $I_x$ the signal current, $R_L$ the load resistance, $U_0$ the individual operating voltage source, and $I_0$ the operating current at the particular working point. The reference symbol ED designates the emission diodes and the reference symbol PD the photodiodes.

Changes may be made within the scope and spirit of the appended claims which define what is believed to be new and desired to have protected by Letters Patent.

The invention claimed is:

1. An electro-optical amplifier for oscillations, particularly in the range of the very short electromagnetic waves comprising:

input means constructed to receive the oscillations to be amplified in the form of electrical signals, at least one emission diode operatively connected to said input means and forming therewith the amplifier input circuit, a first coaxial conductor having one end thereof closed with a window formed therein, said one emission diode being electrically coupled from said closed end to the center conductor of said coaxial conductor, direct current means connected to such emission diode for biasing the same in a flow direction, said emission diode being operative to transform the electrical signal oscillations into an optical signal, at least one further photodiode optically connected with such emission diode, output means operatively connected with said further photodiode and forming therewith the amplifier output circuit, a second coaxial conductor having said further photodiode electrically coupled from one end thereof to the center conductor thereof, said second coaxial conductor being from said first coaxial conductor and having a window therein for receiving light rays from the window of said first coaxial conductor, said further photodiode being operative to transform said optical signal received thereby into electrical oscillation signals, the amplified signals appearing at said output means.

* * * * *